(12) United States Patent
Kapteijn

(10) Patent No.: US 9,611,010 B2
(45) Date of Patent: Apr. 4, 2017

(54) REDUCING DRAG OF A HULL OF A SHIP

(76) Inventor: Pieter Karel Anton Kapteijn, Hellerup (DK)

( * ) Notice: Subject to any disclaimer, the term of this patent is extended or adjusted under 35 U.S.C. 154(b) by 545 days.

(21) Appl. No.: 13/806,060

(22) PCT Filed: Jun. 22, 2011

(86) PCT No.: PCT/EP2011/060497
§ 371 (c)(1),
(2), (4) Date: Jul. 2, 2013

(87) PCT Pub. No.: WO2011/161187
PCT Pub. Date: Dec. 29, 2011

(65) Prior Publication Data
US 2013/0269589 A1    Oct. 17, 2013

Related U.S. Application Data

(60) Provisional application No. 61/357,380, filed on Jun. 22, 2010.

(30) Foreign Application Priority Data

Jun. 22, 2010    (DK) .................................. 2010 70283

(51) Int. Cl.
B63B 1/38    (2006.01)

(52) U.S. Cl.
CPC .......... *B63B 1/38* (2013.01); *B63B 2001/387* (2013.01); *Y02T 70/122* (2013.01)

(58) Field of Classification Search
CPC ................ B63B 1/38; B63B 2001/382; B63B 2001/385; B63B 2001/387; Y02T 70/121; Y02T 70/122

USPC .............................................. 114/67 R, 67 A
See application file for complete search history.

(56) References Cited

U.S. PATENT DOCUMENTS

| | | | |
|---|---|---|---|
| 5,524,660 A | 6/1996 | Dugan | |
| 5,575,232 A * | 11/1996 | Kato et al. | ................. 114/67 A |
| 5,613,456 A | 3/1997 | Kuklinski | |
| 6,186,085 B1 | 2/2001 | Kato | |
| 6,356,816 B1 * | 3/2002 | Katz | ................ 701/21 |
| 6,932,012 B1 | 8/2005 | Philips | |
| 7,080,664 B1 | 7/2006 | Ayer | |
| 7,654,212 B2 * | 2/2010 | Takahashi | ................... 114/67 A |
| 2002/0014192 A1 | 2/2002 | Takahashi | |
| 2009/0260561 A1 | 10/2009 | Takahashi | |

FOREIGN PATENT DOCUMENTS

| | | |
|---|---|---|
| CN | 1220225 A | 6/1999 |
| CN | 1378946 A | 11/2002 |
| CN | 2652812 Y | 11/2004 |
| EP | 903287 A2 | 3/1999 |

(Continued)

OTHER PUBLICATIONS

International Search Report and Written Opinion for PCT/EP2011/060497, mailed Aug. 9, 2011.

*Primary Examiner* — Ajay Vasudeva
(74) *Attorney, Agent, or Firm* — Brinks Gilson & Lione

(57) ABSTRACT

Disclosed is an apparatus for generating bubbles for reducing drag on a hull of a ship, wherein the bubble generating device is attachable to an outer surface of the hull, and wherein the apparatus comprises one or more microfluidic device for controlling a bubble size of the generated bubbles.

23 Claims, 8 Drawing Sheets

(56) References Cited

FOREIGN PATENT DOCUMENTS

| | | |
|---|---:|---|
| EP | 903287 A3 | 1/2002 |
| GB | 2429435 A | 2/2007 |
| JP | H09240571 A | 9/1997 |
| JP | 10119875 A | 5/1998 |
| JP | 10175587 A | 6/1998 |
| JP | 11049080 A | 2/1999 |
| JP | 11152077 A | 6/1999 |
| JP | 2000062682 A | 2/2000 |
| JP | 2009274463 | 11/2009 |
| JP | 2010508143 A | 3/2010 |
| WO | 2008053174 A1 | 5/2008 |
| WO | 2008053174 A8 | 5/2008 |
| WO | 2009122736 A1 | 10/2009 |

\* cited by examiner

REDUCING DRAG OF A HULL OF A SHIP

RELATED APPLICATIONS

This application claims the benefit under 35 U.S.C. §371 of International Patent Application No. PCT/EP2011/060497, having an international filing date of Jun. 22, 2011, which claims priority to Danish Patent Application No. PA 2010 70283, filed Jun. 22, 2010, and U.S. Provisional Application No. 61/357,380, filed Jun. 22, 2010, the contents of all of which are incorporated herein by reference in their entirety.

FIELD OF THE INVENTION

This invention generally relates to the generation of bubbles, in particular micro-bubbles, for reducing drag of a hull of a ship.

BACKGROUND OF THE INVENTION

It is generally desirable to reduce frictional resistance, also referred to as drag, of the hull of a ship, as this may increase the operating speed of the ship and/or reduce the fuel consumption.

JP10119875A discloses a system for reducing the frictional resistance a ship by forming an exhaust nozzle on a chamber installed on a surface of a spherical bow of a ship body, and by jetting air pressure supplied to the chamber by an air pressure supplying means, from the exhaust nozzle, so that the bubbles and an air layer are intervened on a boundary layer kept into contact with a submerged surface. The exhaust nozzle is formed by a front plate of a chamber which front plate has a number of pores. The air pressure is jetted into the water from the pores so as to generate a number of bubbles outside of the exhaust nozzle in such manner that they are spread along the flow lines and cover the submerged surface, whereby the friction is reduced.

GB2429435A discloses a vessel hull having an air lubrication apparatus which comprises an air pump for supplying pressurised air to a porous membrane attached to the exterior of the hull and keel, or a system of air ducts attached to the keel and hull of the vessel, or mounted within the hull of the vessel.

JP10175587A discloses a method wherein small air bubbles are fed in a boundary layer so as to reduce the generation of frictional resistance of a hull. The bubbles are blown out of a porous plate in which a number of small ports are formed at given pitches.

CN2652812Y discloses a micro bubble generator used for drag reduction comprising a cavity, a connection pipeline, a pressure air power machine and a porous silicon plate However, even though the above prior art systems disclose the generation of bubbles by means of bubble generators which can be fitted to a ship's hull, it remains a problem to provide a method for generating micro-bubbles for efficiently reducing the drag or frictional resistance of a ship's hull during different operational conditions, e.g. different speeds, water temperature, draught, and/or the like.

SUMMARY

Disclosed herein is an apparatus for generating bubbles for reducing drag of a hull of a ship, wherein the bubble generating device is attachable to an outer surface of the hull, and wherein the apparatus comprises a micro-fluidic device for generating bubbles of a well-defined bubble size of the generated bubbles. The bubbles are formed in a boundary layer of the water surrounding the hull, i.e. at the interface between the hull and the surrounding water.

The bubble size of the generate bubbles may be controllable by means of a micro fluidic device, e.g. by controlling a flow of the bubble-forming fluid, whereby an efficient control of the bubble size is provided, which in turn allows an efficient and controllable drag reduction even at different operational conditions.

Generally, microfluidic devices allow precise control and manipulation of fluids that are geometrically constrained to a small, typically sub-millimeter, scale. Generally a microfluidic device may comprise a device providing at least one fluid path having a lateral dimension of less than 3 mm, e.g. less than 1 mm, e.g. less than 500 micrometers, e.g. between 100 nm and 500 micrometers. The behavior of fluids at the microscale can differ from 'macrofluidic' behavior in that factors such as surface tension, energy dissipation, and fluidic resistance dominate the system. At small scales, where channel diameters are around 100 nanometers to several hundred micrometers, the Reynolds number, which compares the effect of momentum of a fluid to the effect of viscosity, can become very low. This results in that fluids may not mix in the traditional sense; and molecular transport between the fluids may be through diffusion.

The term micro-fluidic device refers to any suitable micro-fluidic structure for the manipulation of continuous fluid flow through micro-fabricated channels. Actuation of fluid flow may be implemented either by external pressure sources, external mechanical pumps, integrated mechanical micropumps, or by combinations of capillary forces and electro-kinetic mechanisms.

The generated bubbles may be micro-bubbles, i.e. bubbles having a diameter of less than 1 mm, e.g. less than 200 µm, e.g. less than 150 µm, e.g. less than 100 µm, such as less than 50 µm, thereby providing efficient drag reduction while maintaining sufficient buoyancy. By adapting the size of the generated bubbles the drag reduction may be improved and adapted to different operational conditions. The micro bubbles may be generated by controlling a flow or feed of a bubble-forming fluid such as air or another suitable gas or mixture of gases, or even a liquid. The term bubble-forming fluid is intended to refer to any suitable fluid, such as a liquid, a gas or mixture of gases, e.g. air, which forms bubbles when released into the water surrounding the hull of the ship. In some embodiments the apparatus comprises a plurality of sets of micro-fluidic devices, wherein the micro-fluidic devices of each set are adapted to generate bubbles at a respective predetermined frequency, and wherein the apparatus comprises a flow selector for selectively directing a supply flow of the bubble-forming fluid to one or a subset of the sets micro-fluidic devices different from the frequency.

In some embodiments, the micro-fluidic device is adapted to generate bubbles of a controllable bubble size by providing a controllable flow of the bubble-forming fluid which flow varies over time, e.g. periodically. For example, the micro-fluidic device may be adapted to create a periodically varying flow. Examples of suitable micro fluidic devices include a micro-fluidic oscillator, a micro-fluidic oscillator flip-flop, a micro-fluidic amplifier, a micro-fluidic switch, and/or combinations thereof. For example, the size and/or frequency of generated bubbles may be controlled by selecting and/or controlling a frequency of the periodically varying flow, e.g. a generation frequency of the generated bubbles. Accordingly, the micro-fluidic device may comprise a controllable fluidic amplifier and/or a controllable fluidic oscillator and/or a controllable fluidic switch.

It is a further advantage of providing a controllable frequency of the generated stream of bubbles, as it allows selecting and/or controlling the frequency of the bubbles so as to control the distance between adjacent bubbles and thus so reduce or even minimise coalescence of the generated bubbles.

In some embodiments, the apparatus is a retro-fittable device that can be fitted to existing ships. The apparatus may e.g. be fitted to the ship in a dry dock, so as to allow the surfaces to which the apparatus is attached to be cleaned and prepared properly. The apparatus may even be fittable under water by a suitable under water bonding technique, such as welding, Epoxy adhesives, etc.

Generally, the apparatus may be attached to the outer surface of the hull, e.g. to the bottom and/or a side wall of the ship, by any suitable attachment means such as by welding, adhesive, epoxy resin bonding; two-component epoxy resin bonding, by means of magnets, such as permanent magnets, etc. or combinations thereof.

The apparatus may comprise a plurality of exhaust nozzles or other suitable outlets for the generated bubbles, e.g. nozzles from which the bubble-forming fluid is output in the form of bubbles. Each of the one or more micro-fluidic devices may be in fluid communication with one or more exhaust nozzles. The nozzles may have a design and a layout specific for the specific hull and/or the desired bubble size and/or form. The outlets for the generated bubbles may be coated to facilitate the flow out of the micro fluidic device, e.g. by a hydrophilic or a hydrophobic coating, e.g. a Teflon coating.

The apparatus may further comprise one or more supply channel for feeding the bubble-forming fluid to the micro-fluidic device. Additionally the apparatus may comprise one or more control channel for providing a control flow of a fluid, e.g. the bubble-forming fluid, to the micro-fluidic device so as to control an operating parameter of the micro-fluidic device.

In one embodiment the apparatus is formed as one or more strips and/or sheets and/or plates that is/are attachable to the outside of the hull of the ship. The shape of the plate or strip may be adapted to fit one or more specific hull shapes and sizes. The apparatus may be made of metal, such as steel, of polymers, plastics, silicone, PDMS, a composite material, etc. and/or combinations thereof. The apparatus may have a thickness (i.e. a dimension orthogonal to the outer surface of the hull of the ship) that is less than 20 mm, such as less than 10 mm, e.g. less than 7 mm, e.g. less than 5 mm, e.g. less than 3 mm, such as less than 2 mm, less than 1 mm, or even less than about 0.5 mm, thereby reducing the additional drag generated by the apparatus. The outer surface of the apparatus and/or the inner surfaces of the nozzles and even the inner surfaces of the micro-fluidic device and/or channels may be coated by a suitable anti-fouling agent or otherwise comprise an anti-fouling agent.

The apparatus may be formed as a layered structure, for example having a base layer, one or more middle layers, and a cover layer. One or more of the layers may comprise micro-structures, e.g. provided in a surface of the layer, forming a micro-fluidic device or devices. Each micro-fluidic device may be arranged in a single layer or formed by a combination of micro-features of different layers. The base layer may provide a backing surface attachable to the hull and supports the middle layer. The base layer may e.g. be made of metal such as steel that may be bonded to the hull of the ship, e.g. by welding, by means of a suitable adhesive, magnets, and/or the like. The middle layer and/or the other layers may be made of a suitable material into which micro-fluidic structures may be formed. Examples of suitable materials include polymers, plastics, silicone, PDMS, a metal such as stainless steel, etc. or combinations thereof. The micro-fluidic structures may be formed in one or more of the layers by any suitable process for generating micro-fluidic structures, e.g. by a suitable etching process. One or more of the layers may further comprise one or more channels and/or the like for supplying the bubble-forming fluid, for feeding the bubble-forming fluid to the exhaust nozzles, and/or the like. The exhaust nozzles may be formed in the cover layer. Alternatively, the nozzles may be provided in the middle layer, e.g. at an edge of the middle layer.

The apparatus may be connectable to an air compressor or another fluid supply apparatus for supplying the bubble-forming fluid. Similarly, the apparatus may be connectable to a control unit for controlling operation of the apparatus.

Disclosed herein is an apparatus for generating bubbles of a fluid for reducing drag on a hull of a ship, wherein the bubble generating device is attachable to an outer surface of the hull, and wherein the apparatus comprises one or more micro-fluidic device for controlling a bubble size of the generated bubbles and wherein at least one micro-fluidic device comprises:
an inlet port for supplying a flow of the fluid;
a first channel comprising a first nozzle for generating bubbles of the fluid for reducing drag on a hull of a ship, said first channel being in fluidic communication with said inlet port through a central chamber; and
a first control channel comprising a first control inlet configured to control the flow through said first nozzle, said first control inlet being in fluidic communication with said inlet port and said first channel through said central chamber.

Consequently, a flexible and simple system is provided capable of producing micro-bubbles of a varying size. By using control channels for controlling the bubble size, a simple central fluid source e.g. a simple compressor, may be used having no direct complex flow control functionalities.

The cross-section of the inlet port, the first nozzle and/or the first control inlet may have a widest width of less than 3 mm, e.g. less than 1 mm, e.g. less than 500 Micrometers, e.g. between 100 nM and 500 micrometers.

In some embodiments, the at least one micro-fluidic device further comprises
a second channel comprising a second nozzle for generating bubbles of the fluid for reducing drag on a hull of a ship, said second channel being in fluidic communication with said inlet port and said first control inlet through said central chamber, and wherein said first control inlet is further configured to control the flow through said second nozzle.

Consequently, a flow may be periodically shifted between the first nozzle and the second nozzle. This may be used to control the size of the generated micro-bubbles by varying the frequency with which the flow shifts between the first nozzle and the second nozzle e.g. under some circumstances by increasing the frequency smaller micro-bubbles are created and by decreasing the frequency larger micro-bubbles are created.

The cross-section of the second nozzle may have a widest width of less than 3 mm, e.g. less than 1 mm, e.g. less than 500 micrometers, e.g. between 100 nm and 500 micrometers.

In some embodiments, at least one micro-fluidic device is configured to increase the total flow resistance from said inlet port to said first nozzle by providing a first control flow through said first control inlet into said central chamber.

Consequently, the flow through the first channel may be temporarily lowered. This may be used to control the size of the generated micro-bubbles.

The first control flow may be transient e.g. the first control flow may have temporal length of no more than 10 seconds, 5 seconds, 2 seconds, 1 second, 200 millisecond, 100 millisecond, 50 millisecond, 25 millisecond, or 10 millisecond. The first control flow may have a average flow-rate substantially lower than the average flow rate through the inlet port. The first control flow may have a average flow-rate corresponding to less than 50%, 25%, 15%, or 10% of the average flow rate through the inlet port. The first control flow may increase the total flow resistance from said inlet port to said first nozzle both when the micro-fluidic device comprises a single channel and a plurality of channels. The first control flow may increase the flow resistance by creating a vortex in the central chamber. The flow resistance may be increase by at least 50%, 100%, 500% 5000% or infinite. The first control flow may be repeated periodically with a frequency, thus the flow through the first nozzle may be periodically lowered significantly e.g. periodically stopped. The frequency with which the first control flow is repeated with may determine the size of the generated micro-bubbles e.g. under some circumstances by increasing the frequency smaller micro-bubbles are created and by decreasing the frequency larger micro-bubbles are created.

In some embodiments, the at least one micro-fluidic device is configured to shift a flow running through said first channel to said second channel by providing a first control flow running through said first control inlet into said central chamber, whereby at least 50%, 60%, 80%, 95%, 99% or 100% of the flow that would have ran through said first channel is redirected to run through said second channel.

The first control flow may be transient e.g. the first control flow may have temporal length of no more than 10 seconds, 5 seconds, 2 seconds, 1 second, 200 millisecond, 100 millisecond, 50 millisecond, 25 millisecond, or 10 millisecond. The first control flow may have a average flow-rate substantially lower than the average flow rate through the inlet port. The first control flow may have an average flow-rate corresponding to less than 50%, 25%, 15%, or 10% of the average flow rate through the inlet port. The first control flow may be repeated periodically with a frequency creating a first control flow signal.

In some embodiments, said at least one micro-fluidic device further comprises
a second control channel comprising a second control inlet for controlling the flow through said first nozzle and said second nozzle, said second control inlet being in fluidic communication with said inlet port, said first channel, said second channel, and said first control inlet through said central chamber.

The cross-section of the second control inlet may have a widest width of less than 3 mm, e.g. less than 1 mm, e.g. less than 500 micrometers, e.g. between 100 nm and 500 micrometers.

In some embodiments, the at least one micro-fluidic device is configured to shift a flow running through said second channel to said first channel by providing a second control flow running through said second control inlet into said central chamber, whereby at least 50%, 60%, 80%, 95%, 99% or 100% of the flow that would have ran through said second channel is redirected to run through said first channel.

The second control flow may be transient e.g. the second control flow may have temporal length of no more than 10 seconds, 5 seconds, 2 seconds, 1 second, 200 millisecond, 100 millisecond, 50 millisecond, 25 millisecond, or 10 millisecond. The second control flow may have a average flow-rate substantially lower than the average flow rate through the inlet port. The first control flow may have an average flow-rate corresponding to less than 50%, 25%, 15%, or 10% of the average flow rate through the inlet port. The second control flow may be repeated periodically with a frequency creating a second control flow signal. The first control flow and the second control flow may be repeated in a synchronized manner. The first control flow signal may have the same frequency as the second control flow signal. The first control flow signal may be phase shifted 180 degrees relative to the second control flow signal. This may be used to control the size of the generated micro-bubbles by varying the frequency of the first control flow signal and the second control flow signal, the flow may shifts faster or slower between the first nozzle and the second nozzle, thus creating larger or smaller micro-bubbles e.g. under some circumstances by increasing the frequency smaller micro-bubbles are created and by decreasing the frequency larger micro-bubbles are created.

In some embodiment, said at least one micro-fluidic device further comprises a feed-back channel connecting said first control channel and said second control channel, whereby said first control outlet and said second control outlet is in direct fluid communication.

Consequently, control flows may be created without the need of a control flow generating system.

In some embodiments, the first control channel and/or the second control channel is in fluid communication with a control system configured to generate control flows through the first control channel and/or the second control channel.

The control system may be controlled by processing unit capable of generating suitable control flow signals. The control system may be coupled in parallel to a plurality of micro-fluidic devices. The control system may be manually controlled or may comprise algorithms capable of automatically generating control flow signals suitable for the environmental conditions of the ship e.g. the water flow rate (speed of the ship), water temperature, or other water parameters influencing micro-bubbles effect on reducing drag. The control system may comprise a fluid generating device e.g. a compressor, a pump or other suitable device for generating the control flows.

In some embodiments, the device comprises a plurality of micro-fluidic devices as specified above. The device may comprise at least 10, 20, 40, 70, 100, 200, or 2000 micro-fluidic devices.

The present invention relates to different aspects including the device described above and in the following, and corresponding methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a hull for a ship comprising a bubble-generating apparatus disclosed herein. Embodiments of the hull may comprise a device comprising micro fluidic means, where the device has a plurality of openings connected to a source of a fluid, e.g. gas such as pressurised air, said plurality of openings being arranged such that the fluid can be ejected through said openings whereby bubbles are formed in the boundary layer of the water surrounding the surface of the hull, wherein a fluidic oscillator or a fluidic amplifier is connected between said source of fluid and each of said plurality of openings, each of said fluidic oscillators or fluidic amplifiers being controllable such that the bubble size of the bubbles ejected from the opening can be varied.

Further disclosed herein is the use of a device comprising micro fluidic means adapted to be attached to the exterior of the hull of a ship for generating micro-bubbles for reducing drag of the hull.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
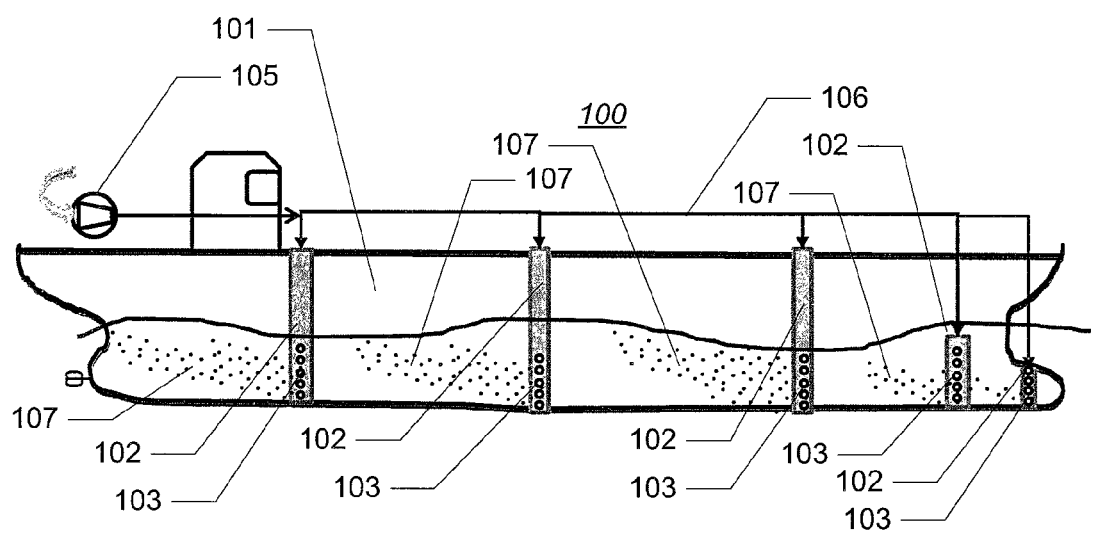
FIG. 1 schematically shows a ship comprising a bubble generating apparatus.

FIG. 1 schematically shows a ship comprising a bubble generating apparatus. The ship, generally designated 100, comprises a hull 101 having attached to it one or more bubble-generating apparatus 102 as described herein. Each bubble-generating apparatus 102 is connected via a supply duct 106 with a compressor 105 for supplying compressed air to the bubble-generating apparatus 102 via supply duct 106. For example, the compressor may take in and compress surrounding air, and optionally add flow agents in small amounts. Even though the compressor in FIG. 1 is shown positioned at the rear of the vessel, it will be understood that the compressor may be located at any suitable position on the vessel and/or that the air intake way be directed in any suitable direction. The bubble generating apparatus comprises exhaust nozzles 103 from which the compressed air is released so as to form micro-bubbles 107 in the boundary layer of water surrounding the hull.

In the example of FIG. 1, multiple bubble generating apparatus 102 are placed at respective locations distributed along the length of the ship's hull. Each apparatus extends from a position proximal to the keel upwards along the hull. Each apparatus 102 generates a respective stream of micro bubbles 107 which, during movement of the ship through the water, extend from the exhaust nozzle 103 rearwards and upwards. It will be appreciated that in different embodiments, the number and placement of the apparatus may vary. For example, in some embodiments a single apparatus, e.g. placed at the front of the ship's hull may suffice, while in other embodiments two, three, or more apparatus may be distributed along the length of the ship's hull. For each ship, an optimum number and placement of the apparatus may be determined by models and/or flow simulations and/or by trial and error.

When blowing small bubbles through an aperture of a nozzle, it may not be sufficient to make the aperture as small as possible in order to generate micrometer-scale bubbles. The reasons for this includes the presence of a wetting force which attaches the growing bubble to the solid surface forming the edge of the aperture. Unless, this anchoring force is disrupted, the bubble will grow until the buoyant force of the bubble, which is proportional to its volume, exceeds the anchoring restraint on the bubble, which is typically proportional to its contact perimeter, and therefore breaks off. In this low pressure offset scenario, the force balance usually breaks off the bubble at a size an order of magnitude larger than the diameter of the aperture. Furthermore, the wetting properties of the solid surface are important. If the bubble contacts the surface over a larger region than the aperture perimeter, for example if the solid surface is hydrophobic, then the gas phase of the growing bubble will form a second anchor force with the solid surface over a wider area, increasing the buoyant force and thus bubble volume required to overcome it. If the surface is hydrophilic, then this attractive force is absent.

A second difficulty associated with the generation of bubbles from small apertures is polydispersity of bubble sizes and irregularity of the spacing between bubbles leading to quick coalescence of the bubble cloud. Even if small bubbles are formed, then coalescence can rapidly reduce the benefit.

A third difficulty associated with the generation of bubbles from small apertures is related to the channelling in a nozzle bank of pores or through a porous ceramic material. The largest bubble that forms provides the path of least resistance, preferentially growing against all other bubbles in the parallel percolation process in a nozzle bank or porous ceramic material.

In embodiments of the bubble-generating apparatus 102 disclosed herein, the bubble size is controlled by a micro-fluidic device which avoids at least some of the above difficulties.

Figure 2:
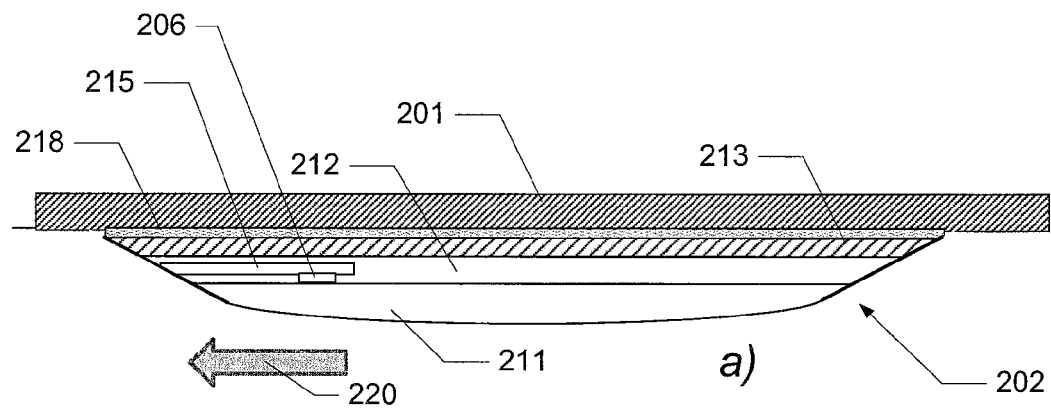
FIG. 2 schematically shows a bubble-generating apparatus.
Figure 2:
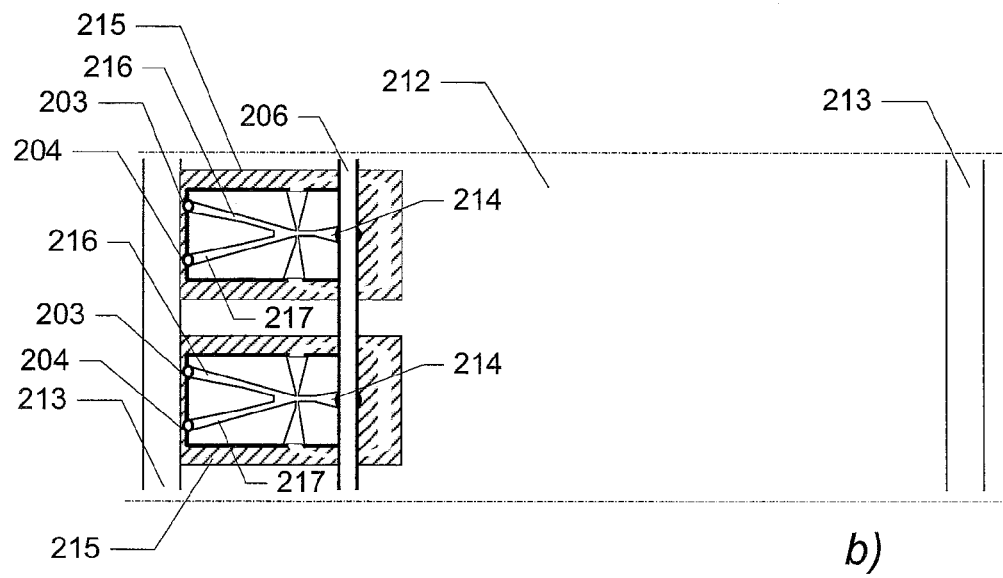

FIG. 2 schematically shows cross-sectional views of a bubble-generating apparatus. FIG. 2a shows a sectional view of the apparatus in a horizontal plane. The direction of the flow of water relative to the ship's hull during forward movement of the ship is illustrated by arrow 220.

The apparatus 202 is a layered structure having a base layer 213 whose backing surface is bonded to the outer surface of the hull 201 of the ship as illustrated in FIG. 2 by bonding layer 218. Furthermore the layered structure 202 may comprise two or more additional layers 211 and 212 sandwiched together by a suitable bonding technique. For example, the layers of the apparatus may be strips or plates/sheets made of stainless steel or one or more other suitable materials, such as plastics, that can be secured to the hull of the ship. The layers 211, 212, 213 may be welded together and/or glued together by a suitable adhesive material, e.g. an epoxy-based material. The base layer may be bonded to the ship's hull by welding, a suitable adhesive substance, e.g. an epoxy based adhesive substance, magnets, and/or the like. The apparatus 202 comprises a middle layer 212 into which one or more micro-fluidic devices 215, e.g. a micro-fluidic oscillator, are embedded, e.g. by a suitable etching process. For example, the fluidic devices 215 may be skin-milled or chemically/electrostatically etched into a stainless steel strip. FIG. 2b shows a sectional view in a vertical plane through a part of the middle layer 212 showing two micro-fluidic devices arranged in a row. It will be appreciated that the middle layer may include more than two fluidic devices arranged in one or more rows, e.g. several hundreds or even thousands of such devices arranged in a side-by side configuration to form one or more rows. Generally, one or more rows of micro-fluidic devices 215 may be arranged from a position under the waterline downward towards the keel of the ship. Each micro-fluidic device 215 is connected via a duct 214 to a supply channel 206 feeding compressed air into the micro-fluidic device 215. Each micro-fluidic device has two output ports or ducts 216 and 217 which feed air output by the micro-fluidic device 215 to exhaust nozzles 203 and 204, respectively. The middle layer 212 is covered by a cover layer 211. The cover layer may have a convex outer surface, and the trailing and leading edges of the respective layers may be slanted so as to providing the apparatus with an overall wing-shaped form.

In the example of FIG. 2, the apparatus comprises a single middle layer 212 including a single row of micro-fluidic devices. In alternative embodiments, the apparatus may comprise a plurality of middle layers, e.g. all sandwiched between the base layer 213 and the cover layer 211. For example, different parts of the microfluidic device may be etched or milled into surfaces of respective layers which may subsequently be aligned and bonded to each other so as to form the micro-fluidic device. Alternatively or additionally, each middle layer may include a respective row of micro-fluidic devices being fed with compressed air by respective supply ducts and comprising respective rows of exhaust nozzles. Hence, the number of exhaust nozzles my be increased and/or multiple rows of nozzles for generating different bubble sizes can be constructed by inserting one or more additional layer with micro fluidic devices. Furthermore, the base layer and/or the cover layer may also comprise micro-fluidic devices and/or parts thereof.

In the example of FIG. 2, the nozzles are shown positioned at the trailing edge of the apparatus, and facing towards the stern of the vessel. However, it will be appreciated that alternatively or additionally, micro-fluidic devices may be arranged with their nozzles at the leading edge and/or in the central region of the strip.

Figure 3:
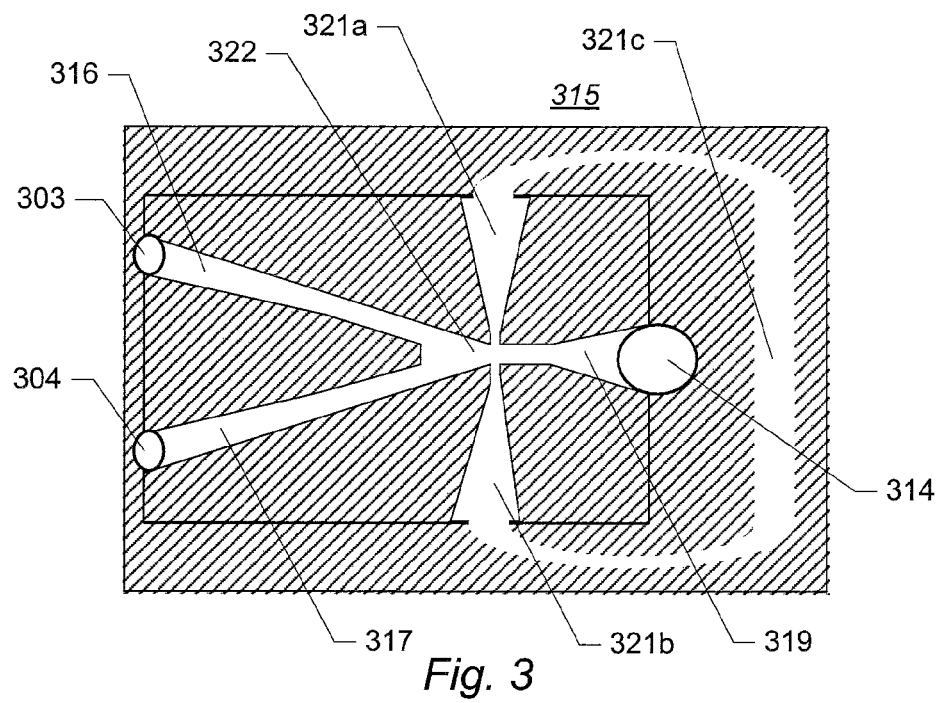
FIG. 3 schematically illustrates a micro-fluidic oscillator alternately feeding two nozzles.

FIG. 3 schematically illustrates a micro-fluidic oscillator 315 alternately feeding two nozzles 303 and 304, respectively. Due to its generally planar arrangement, the oscillator can be arranged in one or more of the layers of a layered structure, e.g. the middle layer 212 of FIG. 2. The micro-fluidic, oscillator 315 comprises an inlet port 314 connectable to a supply channel for pressurised air or another suitable bubble-forming fluid a jet-forming channel 319 feeding into a split path composed of a pair of branch channels 316 and 317 that each terminate at respective one of the output ports 303 and 304. The output ports may form or be connected to corresponding outlet nozzles where the bubble-forming fluid exits into the surrounding water so as to form bubbles. The oscillator further comprises control channels 321a and 321b connected to opposite lateral (relative to the flow direction) ports of an interaction zone 322 of the oscillator, downstream from the jet-forming channel 319 and upstream from the pair of branch channels. In the example of FIG. 3, the control channels 321a and 321b are in fluid communication with each other via a feedback loop 321c.

In use, compressed air is introduced into inlet port 314 from a supply channel, e.g. supply channel 206 of FIG. 2. In some embodiment, the cross-sectional dimension of the jet-forming channel 319 may decrease in a downstream direction, thus causing the velocity of the injected stream to increase. When the air stream passes the interaction zone 322, the stream induces the formation of an oscillating pressure wave in a control fluid in the control channels 321a and 321b. The control fluid may be a liquid or a gas such as air. The oscillating pressure wave forces the jet stream into one of the branch channels 316 and 317. As the pressure wave in the control fluid oscillates back and forth through the feedback loop 321c, the jet is alternately switched between the two branch channels, thus causing oscillating bursts of air flow in each of the branch channels. When a burst reaches one of the outlet nozzles formed by or connected to output ports 303 and 304, an air bubble is generated. The bubble growth is limited by the duration of the oscillating burst, and thus by the oscillating frequency of the oscillator 315. In particular, the bubble growth may stop while the bubbles are smaller than the bubbles that would be generated by a constant flow of air through an output nozzle of the same size. Furthermore, as the bursts in each branch channel oscillate with a relative phase difference, the bubbles are generated alternatingly from the output nozzles 303 and 304, thus improving the separation of the bubbles originating from neighbouring nozzles. As the control channels are connected to form a feedback loop, no additional control supply channels are required. The frequency of the oscillating bursts can be selected or even altered in several ways, e.g. by altering the length of the feedback loop.

It will be appreciated that, in alternative embodiments, the control channels 321a and 321b may be connected to respective control supply channels in addition to or instead of being connected to each other by a feedback loop. In such an embodiment, the control supply channels may be connected to one or more pulsating pressure source, e.g. a sound source, e.g. as described in connection with FIG. 7 below. Hence, the micro-fluidic device would operate as an amplifier where a pulsating pressure wave is applied to the control channels 321a and 321b which in turn causes the oscillating bursts of air flow in the branch channels. By controlling the frequency of the pulsating pressure source, the size of the generated bubbles may be controlled. It will further be appreciated that alternative embodiments of micro-fluidic devices for generating pulsating bursts of pressurised air may be used, e.g. as disclosed in U.S. Pat. No. 5,524,660 in the context of atomizing a liquid.

By providing micro-fluidic devices formed in a plate, sheet or other layer of a layered structure, the bubble generating apparatus may be implemented as a relatively flat structure, thereby allowing securing the apparatus to the hull of a ship without excessive increase of the drag. For example, the total thickness of the layered structure of FIG. 2 may be less than 20 mm, e.g. less than 10 mm, e.g. between 5-7 mm, or even less.

In some embodiments, the surface surrounding the exhaust nozzles 303 and 304 and/or at least a part of the inner surface of the branch channels at least in a proximity of the exhaust nozzles may be coated with a suitable coating, e.g. a hydrophobic coating, a hydrophilic coating, a Teflon coating, or the like, so as to facilitate bubble release.

Figure 4:
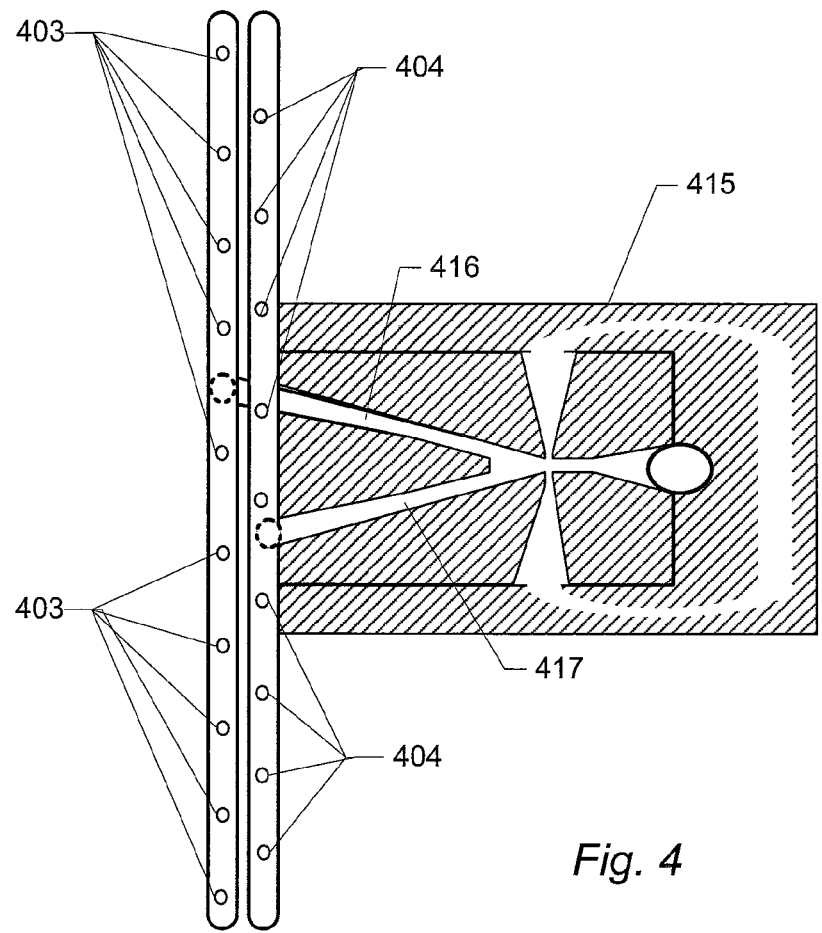
FIG. 4 schematically illustrates a micro-fluidic oscillator alternately feeding two sets of nozzles.

FIG. 4 schematically illustrates a micro-fluidic oscillator 415 alternately feeding two sets of nozzles 403 and 404, respectively. Hence, each oscillator or other micro-fluidic device may feed respective nozzle banks, thus increasing the number of exhaust nozzles.

Generally, in some embodiments, the frequency of the micro-fluidic devices is controllable, e.g. by controlling the frequency of pressure pulses applied to the control channels of a micro-fluidic amplifier as described above, or by combining one or more micro-fluidic oscillators with other micro-fluidic devices, e.g. a micro-fluidic amplifier configured to vary the pressure of the stream of compressed air entering the micro-fluidic oscillator, and/or by otherwise varying parameters, e.g. the pressure and/or temperature, of the compressed air entering the micro-fluidic oscillators and/or of the control fluid in the feedback loop. For example, a heating wire may be embedded in the layered structure for controlling the temperature of the control fluid.

Figure 5:
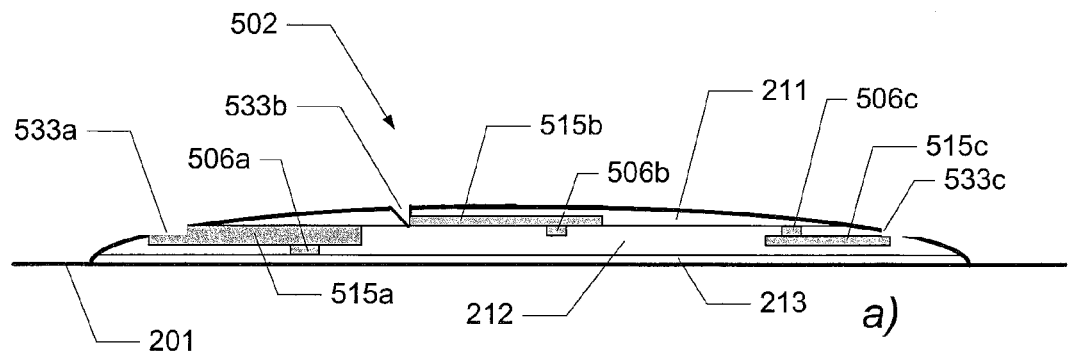
FIG. 5 schematically illustrates an embodiment of an apparatus comprising a plurality of sets of micro-fluidic oscillators.
Figure 5:
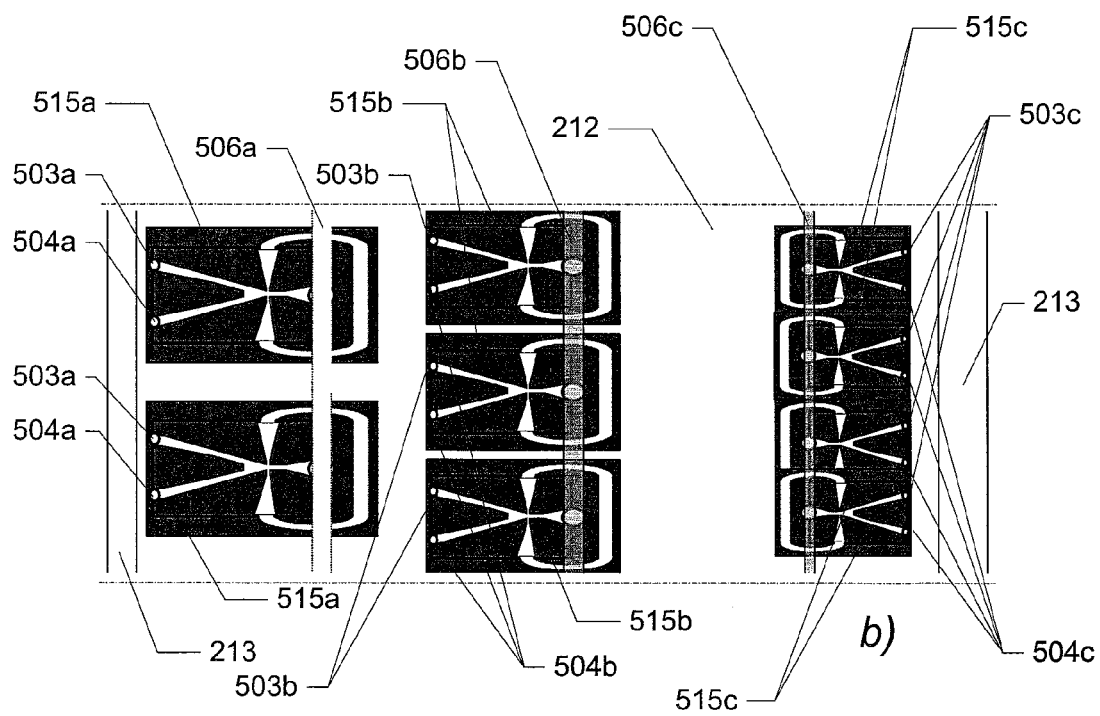

Alternatively, the apparatus may include two or more sets of micro-fluidic devices such as micro-fluidic oscillators, each set adapted to operate at a different frequency, thus generating bubbles of different sizes. This is illustrated in FIG. 5, where the device comprises three sets of micro-fluidic oscillators, designated 515a, 515b, and 515c, respectively, each set being supplied by a respective supply channel 506a, 506b, 506c. The micro-fluidic oscillators of each set have a common oscillating frequency, but the micro-fluidic oscillators of different sets have different frequencies, e.g. defined by the length of their respective feedback loops. Consequently by selectively feeding air into one of the sets of micro-fluidic devices, bubbles of different sizes may be created.

The apparatus of FIG. 5 is similar to the apparatus shown in FIG. 2 in that it is a layered structure comprising a base layer 213 and additional two layers 212 and 211 as described in connection with FIG. 2. The base layer 213 is mounted on the outer surface of the hull 201 of a ship. The middle layer 212 comprises a number micro-fluidic devices 515a and 515c and corresponding supply channels 506a and 506c, and is sandwiched between the base layer 213 and the cover layer 211. In the embodiment of FIG. 5, the cover layer 211 is also structured and includes a further set of micro-fluidic devices 515b and a supply channel 506b. For example, the micro-fluidic devices 515a and 515c may be provided at the surface of the middle layer facing the cover layer, and the micro-fluidic devices 515b may be provided at the surface of the cover layer facing the middle layer.

The micro-fluidic devices of each set of micro-fluidic devices are arranged in a side by side configuration such that their output nozzles are arranged in respective rows. In FIG. 5b, a part of the apparatus is shown including rows of three micro-fluidic devices. It will be appreciated that the apparatus may comprise a large number of devices arranged in respective rows. In the embodiment of FIG. 5, the output nozzles 503a and 504a of the micro-fluidic devices 515a are arranged at a trailing edge of the apparatus; the output nozzles 503b and 504b of the micro-fluidic devices 515b are arranged along a central line of the apparatus; and the output nozzles 503c and 504c of the micro-fluidic devices 515c are arranged at a leading edge of the apparatus.

Figure 6:
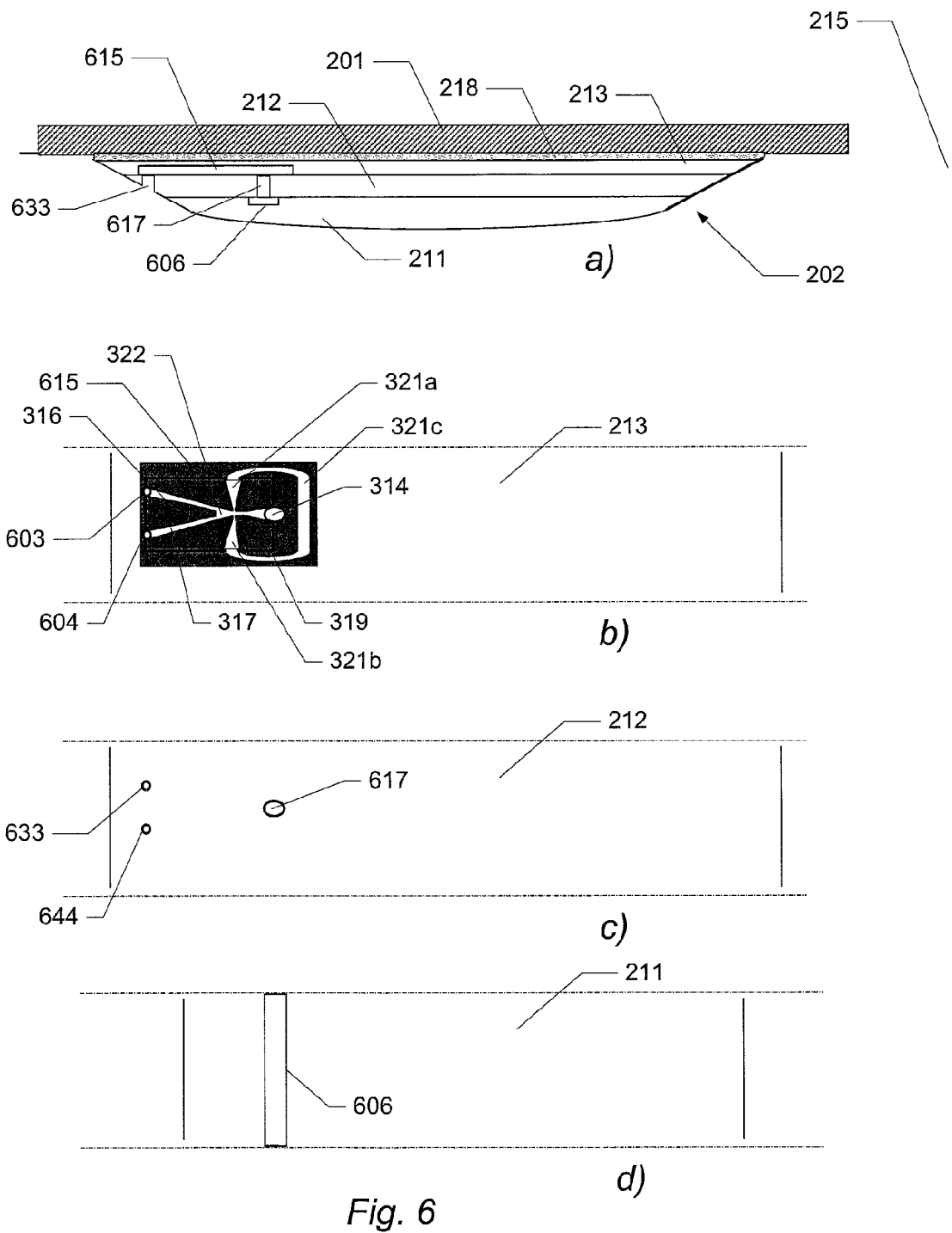
FIG. 6 schematically shows another embodiment of a bubble-generating apparatus.

FIG. 6 schematically shows another embodiment of a bubble-generating apparatus. FIG. 6a schematically shows a cross-sectional view of the bubble-generating apparatus. The apparatus of FIG. 6 is similar to the embodiment shown in FIG. 2 comprising a base layer 213, a middle layer 212, and a cover layer 211. FIGS. 6b-d show top views of parts of the respective layers. The shown parts include a single micro-fluidic oscillator; however, it will be understood that the apparatus may comprise a large number of such oscillators arranged in a side-by side configuration. In particular, FIG. 6b shows a top view of a portion of the base layer, i.e. the surface facing the middle layer; FIG. 6c shows a top view of a portion of the middle layer 212, while FIG. 6d shows a bottom view of a portion of the cover layer 211, i.e. showing the surface facing the middle layer. In the example of FIG. 6, the apparatus comprises a plurality of micro-fluidic devices 615 connected to a supply channel. All three layers are structured and comprise respective parts of the micro-fluidic device 615 and/or the supply channel. The base layer 213 comprises the main micro-fluidic structure of the micro-fluidic devices, in this case a micro-fluidic oscillator as described in connection with FIG. 3. The structure embedded in the base layer comprises the inlet port 314, the jet-forming channel 319, the interaction zone 322, control channels 321a and 321b, the feedback loop 321c, and branch channels 316 and 317 terminating in respective output ports 603 and 604.

The middle layer 212 comprises an input channel 617 and output channels 633 and 644. The input and out channels of the middle layer are formed as through holes extending through the entire middle layer and being aligned with the input port 314 and the terminals 603 and 604 of the branch channels, respectively. The input channel 617 thus provides fluid communication between the inlet port 314 and the supply channel 606. As the cover layer 211 does not extend over the entire width of the middle layer, leaving an edge portion of the surface of the middle layer exposed, the output channels 633 and 644 extend to the outer surface of the apparatus thus forming respective output nozzles. The cover layer 211 comprises the supply channel 606, e.g. in the form of an elongated recess in the bottom surface of the cover layer.

Figure 7:
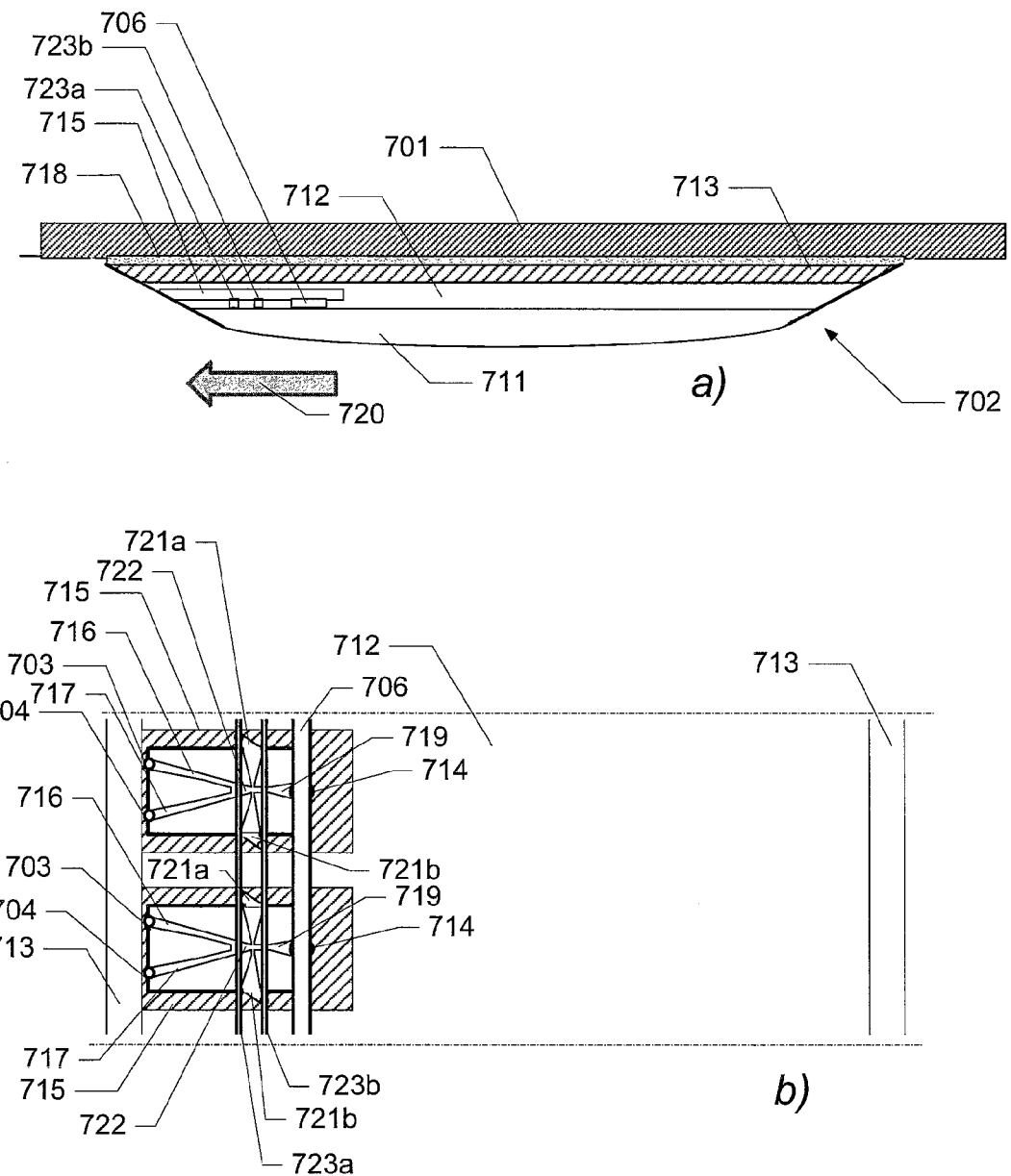
FIG. 7 schematically shows cross-sectional views of a bubble-generating apparatus.

FIG. 7 schematically show cross-sectional views of a bubble-generating apparatus. FIG. 7a shows a sectional view of the apparatus in a horizontal plane. The direction of the flow of water relative to the ship's hull during forward movement of the ship is illustrated by arrow 720.

The apparatus 702 is similar to the apparatus of FIG. 2 in that it is formed as a layered structure having a base layer 713 whose backing surface is bonded to the outer surface of the hull 701 of the ship as illustrated in FIG. 7 by bonding layer 718. Furthermore the layered structure 702 may comprise two or more additional layers 711 and 712 sandwiched together by a suitable bonding technique, all as described in connection with FIG. 2

The apparatus 702 comprises a middle layer 712 into which one or more micro-fluidic devices 715, e.g. a micro-fluidic oscillator, are embedded, e.g. by a suitable etching process, also as described in connection with FIG. 2. FIG. 7b shows a sectional view in a vertical plane through a part of the middle layer 712 showing two micro-fluidic devices arranged in a row.

Each micro-fluidic device 715 is connected via a duct 714 to a supply channel 706 feeding compressed air into the micro-fluidic device 715. Each micro-fluidic device has two output ports or ducts 716 and 717 which feed air output by the micro-fluidic device 715 to exhaust nozzles 703 and 704, respectively. The middle layer 712 is covered by a cover layer 711, all as described in connection with 2. The micro-fluidic device 715 is a micro-fluidic oscillator alternately feeding the two nozzles 703 and 704, respectively. The micro-fluidic oscillator 715 is similar to the micro-fluidic oscillator shown in FIG. 3 in that it an inlet port 714 connected to the supply a supply channel for pressurised air 706; a jet-forming channel 719 feeding into a split path composed of a pair of branch channels 716 and 717 that each terminate at respective one of the output ports 703 and 704, all as described in connection with FIG. 3. The oscillator further comprises control channels 721a and 721b connected to opposite lateral (relative to the flow direction) ports of an interaction zone 722 of the oscillator, downstream from the jet-forming channel 719 and upstream from the pair of branch channels.

The apparatus of FIG. 7 differs from the apparatus of FIG. 2 and the micro-fluidic oscillator of FIG. 3 in that the control channels 721a and 721b are connected to respective control supply channels 723a and 723b, so as to provide fluid communication between each of the control channels and a respective one of the control supply channels for feeding a control flow of pressurised air or another suitable fluid into the control channels 721a and 721b, respectively. Each control supply channel is connected to a corresponding pulsating pressure source (not explicitly shown), e.g. a sound source. The pulsating pressure sources are controlled to provide a pulsating pressure of the pressurised air; in particular the pressure sources may be controlled to vary the pressure in the control channels 721a and 721b at the same frequency but with a phase-shift of half a period relative to each other, so as to force the oscillator 715 to oscillate at the frequency imposed by the pulsating pressure sources.

Figure 8:
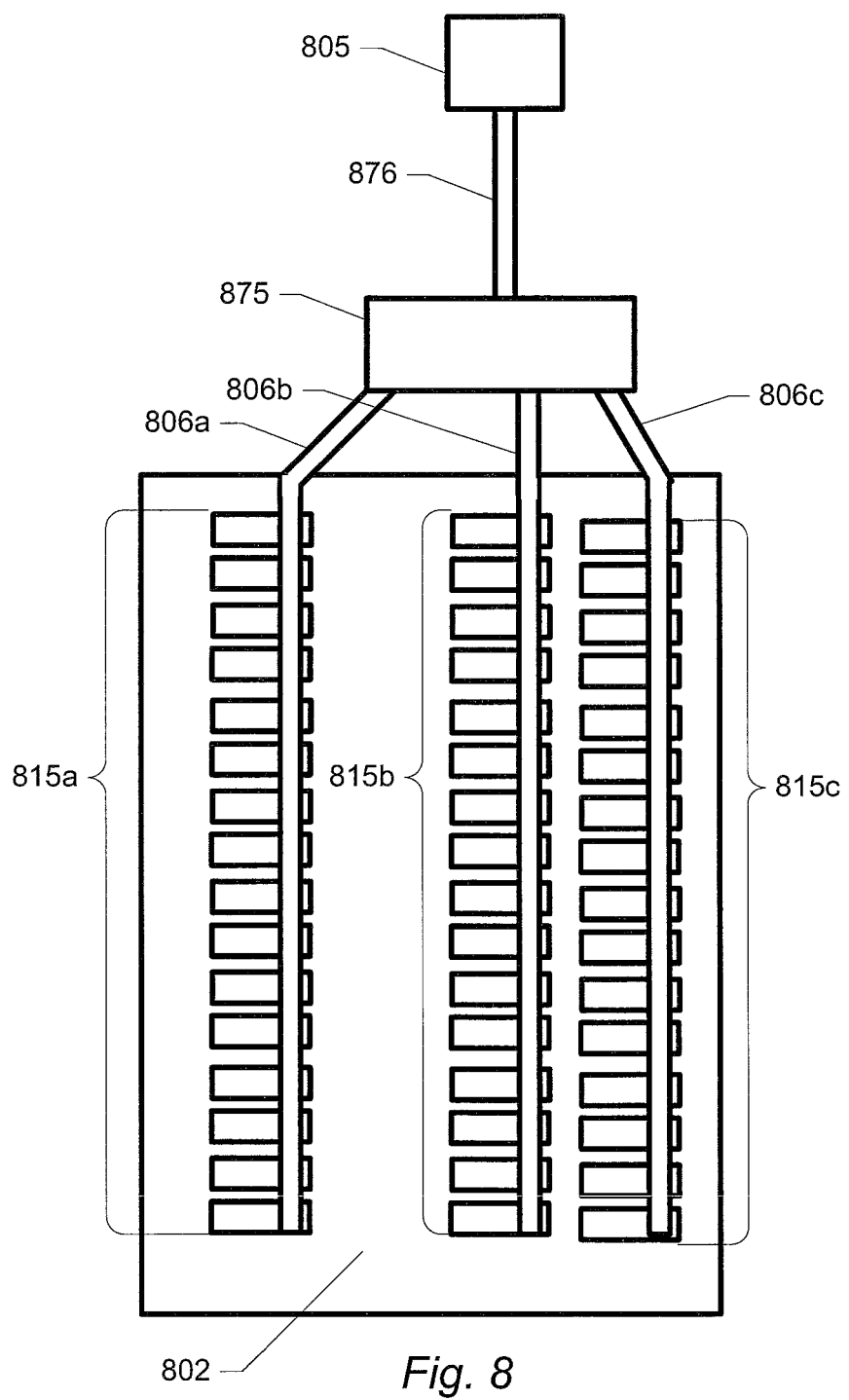
FIG. 8 shows another example of an apparatus including multiple sets of micro-fluidic devices such as micro-fluidic oscillators.

FIG. 8 shows another example of an apparatus including multiple sets of micro-fluidic devices such as micro-fluidic oscillators, each set adapted to operate at a different frequency, thus generating bubbles of different sizes. The apparatus 802 comprises three sets of micro-fluidic oscillators, designated 815a, 815b, and 815c, respectively, each set being supplied by a respective supply channel 806a, 806b, 806c, e.g. as described in connection with FIG. 5. The micro-fluidic oscillators of each set have a common oscillating frequency, but the micro-fluidic oscillators of different sets have different frequencies, e.g. defined by the length of their respective feedback loops. Consequently by selectively feeding air or another fluid into one of the sets of micro-fluidic devices, bubbles of different sizes may be created. To this end, the supply channels 806a-c are connected in fluid communication to a flow selector 875 which in turn is connected via fluid conduit 876 to a fluid source 805, e.g. a compressor for compressing air. The bubble-forming fluid is thus fed from the fluid source into the flow selector 875 which is controllable to selectively direct the fluid into one of the supply channels 806a-c and, thus, to one of the sets of micro-fluidic devices 815a-c.

Figure 9A:
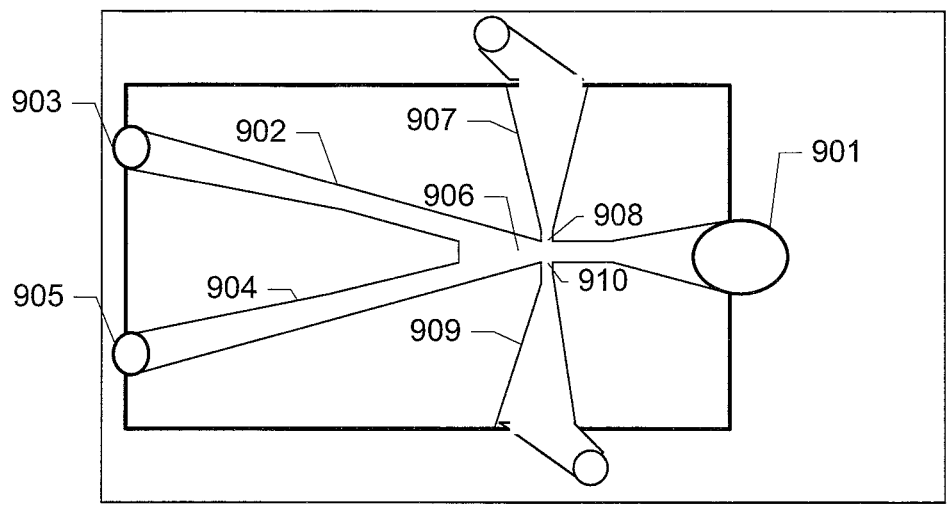
FIG. 9a shows a micro-fluidic device according to some embodiments of the present invention.

FIG. 9a shows a micro-fluidic device 900 according to some embodiments of the present invention. The micro fluidic device comprises an inlet port 901, a first channel 902, a second channel 904, a first control channel 907, and a second control channel 909. The first channel 902 and the second channel 904 are in fluid communication with the inlet port 901, the first control channel 907 and the second control channel 909 through a central chamber 906. The first channel 902 comprises a first nozzle 903 for generating micro-bubbles. The second channel comprises a second nozzle 905 for generating micro-bubbles. The first control channel 907 comprises a first control inlet 908, and the second control channel 909 comprises a second control inlet 910. The first control channel 907 may be connected to the second control channel 909 by a feed-back channel so that the first control outlet 908 and the second control outlet 910 is in direct fluid communication through said feed-back channel. Additionally or alternatively the first control channel 907 and/or tore second control channel 909 may be in fluid communication with a control system configured to generate control flows.

Figure 9B:
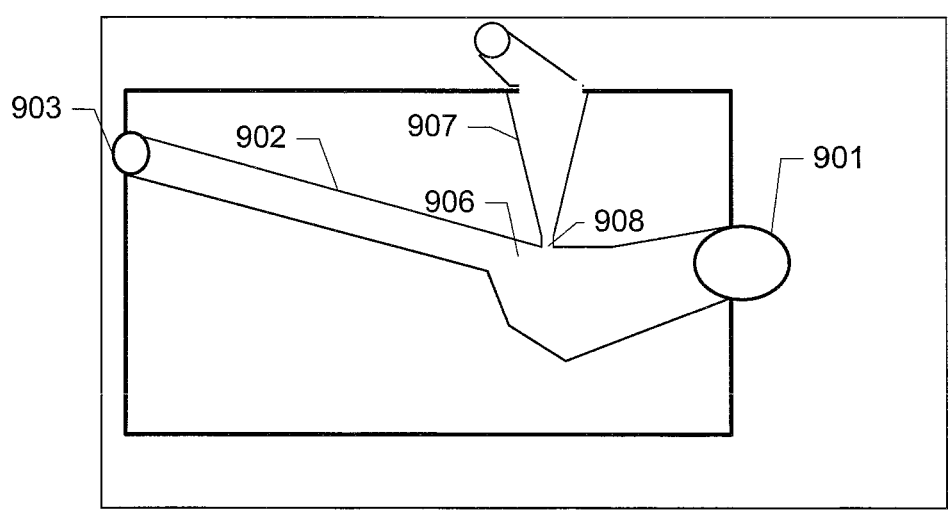
FIG. 9b shows a micro-fluidic device according to some embodiments of the present invention.

FIG. 9b shows a micro-fluidic device 900 according to some embodiments of the present invention, where the micro-fluidic device only comprises a single channel and nozzle.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An apparatus for generating bubbles of a fluid for reducing drag on a hull of a ship, the apparatus comprising:
   an attachment mechanism that facilitates attachment of the apparatus to an outer surface of the hull;
   at least two micro-fluidic devices for generating said bubbles;
   a layered structure comprising two or more layers, each of the layers comprising inner and outer surfaces, wherein a first of the layers comprises a first microstructure forming at least a part of a first of the at least two micro-fluidic devices and a second of the layers comprises a second microstructure forming at least a part of a second of the at least two micro-fluidic devices so that a first of the layers is sandwiched between the outer surface of the hull and the inner surface of a second of the layers, and wherein the layers comprise a supply channel that connects to the at least two microfluidic devices for feeding compressed air into the at least two micro-fluidic devices and facilitate outputting of bubbles at each of the layers.

2. The apparatus according to claim 1, wherein the at least two micro-fluidic devices are adapted to control a bubble size of the generated bubbles.

3. The apparatus according to claim 1, wherein at least one of the micro-fluidic devices comprises:
   an inlet port for supplying a flow of the fluid;
   a first channel comprising a first nozzle for generating bubbles of the fluid for reducing drag on a hull of a ship, said first channel being in fluidic communication with said inlet port through a central chamber; and
   a first control channel comprising a first control inlet configured to control the flow through said first nozzle, said first control inlet being in fluidic communication with said inlet port and said first channel through said central chamber.

4. The apparatus according to claim 3, wherein the at least one of the micro-fluidic devices is configured to increase the total flow resistance from said inlet port to said first nozzle by providing a first control flow through said first control inlet into said central chamber.

5. The apparatus according to claim 1, wherein at least one of the at least two micro-fluidic devices further comprises:

a second channel comprising a second nozzle for generating bubbles of the fluid for reducing drag on a hull of a ship, said second channel being in fluidic communication with said inlet port and said first control inlet through said central chamber, and wherein said first control inlet is further configured to control the flow through said second nozzle.

6. The apparatus according to claim 5, wherein the at least one of the micro-fluidic devices is configured to shift a flow running through said first channel to said second channel by providing a first control flow running through said first control inlet into said central chamber, whereby at least 50% of the flow that would have ran through said first channel is redirected to run through said second channel.

7. The apparatus according to claim 5, wherein said at least one of the micro-fluidic devices further comprises:
a second control channel comprising a second control inlet for controlling the flow through said first nozzle and said second nozzle, said second control inlet being in fluidic communication with said inlet port, said first nozzle, said second nozzle, and said first control inlet through said central chamber.

8. The apparatus according to claim 5, wherein the at least one of the micro-fluidic devices is configured to shift a flow running through said second channel to said first channel by providing a second control flow running through said second control inlet into said central chamber, whereby at least 50% of the flow that would have ran through said second channel is redirected to run through said first channel.

9. The apparatus according to claim 7, wherein said at least one micro-fluidic device further comprises a feed-back channel connecting said first control channel and said second control channel, whereby said first control outlet and said second control outlet is in direct fluid communication.

10. The apparatus according to claim 7, wherein the first control channel or the second control channel is in fluid communication with a control system configured to generate control flows through the first control channel or the second control channel.

11. The apparatus according to claim 1, wherein the device is adapted to generate bubbles of a controllable bubble size by providing a flow of a bubble-forming fluid which flow varies over time.

12. The apparatus according to claim 1, wherein at least one of the micro-fluidic devices comprises at least one of: a micro-fluidic oscillator, a micro-fluidic oscillator flip-flop, a micro-fluidic amplifier, and a micro-fluidic switch.

13. The apparatus according to claim 1, wherein the apparatus is a retro-fittable device attachable to an existing ship.

14. The apparatus according to claim 1, further comprising a plurality of exhaust nozzles for outputting a fluid in the form of bubbles.

15. The apparatus according to claim 1, further comprising a plurality of sets of micro-fluidic devices, wherein the micro-fluidic devices of each set are adapted to generate bubbles having a respective bubble size, and wherein the apparatus comprises a flow selector for selectively directing a supply flow of the bubble-forming fluid to one or a subset of the sets micro-fluidic devices different from the frequency.

16. The apparatus according to claim 15, wherein the micro-fluidic devices of each set are adapted to generate bubbles at a respective predetermined frequency.

17. The apparatus according to claim 1, wherein the fluid is a gas.

18. The apparatus according to claim 1, wherein the first layer comprises a micro-structured surface forming at least a part of the first micro-fluidic device.

19. The apparatus according to claim 1, wherein the apparatus comprises a bonding surface for bonding the apparatus to the hull of a ship and a convex outer surface opposite the bonding surface.

20. The apparatus according to claim 1, comprising a plurality of exhaust nozzles for outputting the fluid, wherein a surface area surrounding each exhaust nozzle is provided with a hydrophilic surface.

21. The apparatus according to claim 1, wherein each of the at least two micro-fluidic devices is formed as a planar system of channels or chambers.

22. A hull for a ship comprising:
a device comprising micro fluidic means, where the device has a plurality of openings connected to a source of fluid, said plurality of openings being arranged such that the fluid can be ejected through said openings so as to form bubbles in the boundary layer of a water towards the hull when the fluid flows along said hull, wherein a fluidic oscillator or a separate fluidic amplifier is connected between said source of air under pressure and each of said plurality of openings, each of said fluid oscillators or fluidic amplifiers being controllable such that the bubble size of the bubbles ejected from the opening can be varied, wherein the apparatus comprises a layered structure comprising two or more layers, each of the layers comprising inner and outer surfaces, wherein a first of the layers comprises a first microstructure forming at least a part of a first micro-fluidic device and a second of the layers comprises a second microstructure forming at least a part of a second micro-fluidic device so that a first of the layers is sandwiched between the outer surface of the hull and the inner surface of a second of the layers, and wherein the layers comprise a supply channel that connects to the microfluidic devices for feeding compressed air into the micro-fluidic devices and facilitate outputting of bubbles at each of the layers.

23. A method of reducing drag on a hull of a ship, the method comprising:
attaching an apparatus for generating bubbles to an outer surface of the hull, wherein the apparatus comprises:
an attachment mechanism that facilitates attachment of the apparatus to the outer surface of the hull;
at least two micro-fluidic devices for generating said bubbles; and
a layered structure comprising two or more layers, each of the layers comprising inner and outer surfaces, wherein a first of the layers comprises a first microstructure forming at least a part of a first of the at least two micro-fluidic devices and a second of the layers comprises a second microstructure forming at least a part of a second of the at least two micro-fluidic devices so that a first of the layers is sandwiched between the outer surface of the hull and the inner surface of a second of the layers, and wherein the layers comprise a supply channel that connects to the at least two microfluidic devices for feeding compressed air into the at least two micro-fluidic devices and facilitate outputting of bubbles at each of the layers;
generating bubbles of a bubble-generating fluid at a boundary between the hull and water surrounding the hull by discharging said bubble-generating fluid through exhaust nozzles of the apparatus into the water; and controlling a size of the generated bubbles by providing a flow of a bubble-forming fluid which flow varies over time.

\* \* \* \* \*